Figure 1:
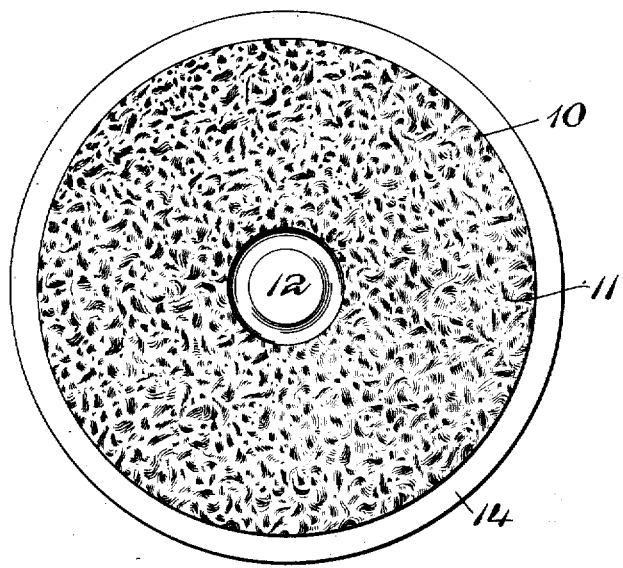

H. D. COHEN.
GLASS FOR HEADLIGHTS.
APPLICATION FILED NOV. 11, 1915.

1,273,580.

Patented July 23, 1918.

INVENTOR
Henry D. Cohen,
BY
Dyke & Canfield.
ATTORNEYS.

UNITED STATES PATENT OFFICE.

HENRY D. COHEN, OF NEWARK, NEW JERSEY.

GLASS FOR HEADLIGHTS.

1,273,580.  Specification of Letters Patent.  Patented July 23, 1918.

Application filed November 11, 1915. Serial No. 60,836.

*To all whom it may concern:*

Be it known that I, HENRY D. COHEN, a citizen of the United States, and a resident of Newark, county of Essex, and State of New Jersey, have invented certain new and useful Improvements in Glasses for Headlights, of which the following is a specification.

This invention relates to a glass to be used in the headlights of automobiles, and is designed to provide a glass that protects the eyes of persons coming toward the automobile, and which at the same time permits the passage of light and diffuses the light so that the road or street in front of the automobile is illuminated sufficiently to give the driver of the automobile a good view of the roadway. The danger of riding with high-powered lights and reflectors has necessitated the passage of laws, in most States, that compel an automobile driver to lower the power of his lights or so dim them that persons coming in the opposite direction are not blinded so that they can not clearly see the road. The dimming of these lights has been done in a number of ways, some automobilists simply covering the glass or lens in the reflector with soap or similar material, others using a translucent or opaque glass over a part of the lens, usually the upper part, while others have covered or darkened certain parts of the bulb of the electric light so as to control the direction of the rays from the bulb to the reflector. In some of these devices the dimming is sufficient and in others it is over-done, and in most of them it still is possible to get a sharp ray of light in the eyes when at a distance from the car, which is unpleasant and very often dangerous.

This invention is designed to provide a lens which is complete in itself and requires no coating or the adjustment of additional parts, which permits the passage of all the light from the reflector through the glass, but so diffuses and scatters the light that the roadway is well illuminated in front of the car, but there is no concentration of light at any point, unless it is at a selected point or points, which points are controlled by a proper disposition of plain or transparent portions left in the glass. The glass of the headlight is made roughened on at least one of its faces so that the light hitting the glass is diffused and scattered to a great extent, the glass at the same time having an edge that is substantially smooth on both faces so that a tight joint can be made between the glass and the bezel or frame in which it is placed.

The invention is also designed to prevent the glass from rattling or moving in a rotative way, this being accomplished by a clip which engages both the glass and the frame to prevent their rotative movement.

Figure 2:
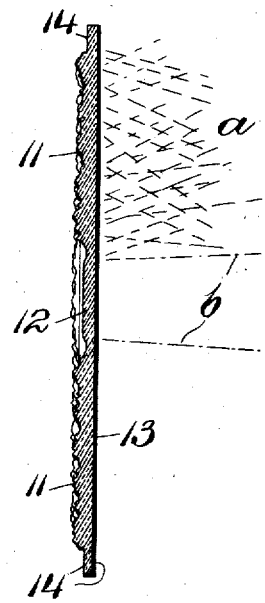
Figure 3:
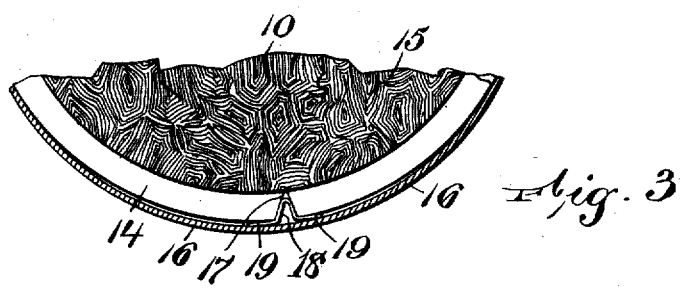

In the drawing I show several embodiments of the invention, in which Figure 1 is a face view of one type, and Fig. 2 is a central vertical section taken through the glass shown in Fig. 1. Fig. 3 is a fragmentary view showing the lower part of a glass, the design being modified from that shown in Fig. 1, part of the frame for holding the glass being illustrated to show the coöperation of the parts.

The glass 10 is of any shape to conform to the type of lamp, but it is usually made round. At least one of the faces of the glass is roughened as at 11, usually with a design that is somewhat irregular and with its whole surface that is to be affected being provided with such roughened surface so that the light passing through is diffused and scattered as shown at $a$ in Fig. 2. A strong light behind a glass of this kind would have its rays pass through the glass to give an illumination on the side of the glass opposite the light, but there is no direct passage of light therethrough and this diffusion and scattering, while giving sufficient illumination, does not affect the eye enough to make it uncomfortable to look at the glass. The glass thus acts to make it safe for an automobilist to look toward the light without interfering with his own comfort or ability to safely run his car. If desired, a smooth or transparent part 12 can be left in the glass, in the view this part being placed in the center, but it will be understood that it can be disposed where desired, sometimes being below the center to permit the direct passage of light as at $b$ in Fig. 2 to give at least one well defined spot of light on the road. The smooth or transparent part 12 is usually placed so that its bright light does not at any point extend more than four and one-half or five feet above the level of the road. The outer face 13 is usually left plain, as a roughened surface on that face would be more apt to catch the dust and remain clouded by reason of such dirt, whereas when it is on the inner face it does not become dusty so quickly, and in order to more effectually keep out the dust and rain, a marginal rim 14 is provided which is smooth on both sides and which thus can be tightly clamped between the frame and bezel or between the two walls of the frame that are known as lens frames and are used in head lights to hold the glass in position. The smooth faces permit the insertion, if desired, of rubber gaskets and similar fixtures which are very often used to prevent lateral movement of the glass.

In Fig. 3 I show a glass with a modified form of design 15 in place of the irregular configuration 11 shown in Fig. 1, and in this figure I show a part of a frame 16 in which the glass is held, this part, which is channeled, receiving the smoothed periphery 14 of the glass 10. The glass 10 is provided with a notch 17 of any desired form, in the drawing the notch being V-shaped, and a spring with a projecting part 18 fits into the V-shaped groove 17 and has spring ends 19 that extend between the glass and the frame 16, if desired, so that they bind the edge of the glass and the frame in a manner to hold the glass against rotative movement by the operation of the parts and against rattling, since the ends 19 continually press the glass so as to force its opposite edge and hold its opposite edge tightly against the inner face of the frame of the head light.

This device has an advantage over a translucent or opaque glass in that none of the light is lost, but is allowed to pass through the glass, the general illumination of the road being sufficient for all practical purposes, even on dark highways, and the rough glass can be used without a completely transparent part, since the diffused and scattered light is sufficient for the purposes of travel. In an opaque or translucent glass there is more rejection of light by the rear face of the glass, and the illumination of the road is limited to a small space and the intense light causes high lights and deep shadows which are not so marked in my form of glass on account of the diffusion of the light.

Having thus described my invention, I claim:

1. A headlight comprising a frame, a glass in the frame, and a spring placed between the periphery of the glass and the inner face of the frame, and pressing the frame outwardly and the glass inwardly, the glass having a recess into which part of the spring projects.

2. A headlight comprising a frame, a glass in the frame, the glass having a V-shaped recess in its periphery, and a spring with a V-shaped part projecting into the recess and having a portion lying between the glass and the frame.

In testimony that I claim the foregoing, I have hereunto set my hand, this 10th day of November, 1915.

HENRY D. COHEN.